United States Patent
Lee et al.

(10) Patent No.: US 9,154,730 B2
(45) Date of Patent: Oct. 6, 2015

(54) SYSTEM AND METHOD FOR DETERMINING THE ACTIVE TALKERS IN A VIDEO CONFERENCE

(75) Inventors: Bowon Lee, Mountain View, CA (US); Debargha Mukherjee, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1015 days.

(21) Appl. No.: 12/580,958

(22) Filed: Oct. 16, 2009

(65) Prior Publication Data
US 2011/0093273 A1 Apr. 21, 2011

(51) Int. Cl.
| G10L 11/00 | (2006.01) |
| H04N 7/15 | (2006.01) |
| G10L 15/24 | (2013.01) |
| G10L 25/78 | (2013.01) |
| H04N 21/439 | (2011.01) |
| H04N 21/44 | (2011.01) |
| H04N 21/4402 | (2011.01) |
| H04N 21/4788 | (2011.01) |
| H04L 29/06 | (2006.01) |

(52) U.S. Cl.
CPC *H04N 7/15* (2013.01); *G10L 15/24* (2013.01); *G10L 25/78* (2013.01); *H04L 65/4038* (2013.01); *H04N 21/4394* (2013.01); *H04N 21/44008* (2013.01); *H04N 21/440245* (2013.01); *H04N 21/4788* (2013.01)

(58) Field of Classification Search
CPC .......... H04N 7/15; G10L 25/78; G10L 25/93
USPC .................. 704/270; 715/811, 767
See application file for complete search history.

(56) References Cited

U.S. PATENT DOCUMENTS

| 6,964,023 B2* | 11/2005 | Maes et al. ..................... 715/811 |
| 2002/0135618 A1* | 9/2002 | Maes et al. ..................... 345/767 |
| 2003/0018475 A1* | 1/2003 | Basu et al. ..................... 704/270 |
| 2008/0052072 A1* | 2/2008 | Chaudhari et al. ............ 704/250 |
| 2008/0162127 A1* | 7/2008 | Laaksonen et al. ........... 704/225 |
| 2008/0218586 A1 | 9/2008 | Graham et al. |
| 2009/0076815 A1* | 3/2009 | Ichikawa et al. .............. 704/233 |

OTHER PUBLICATIONS

Theodoros Petsatodis, "Robust Voice Activity Detection Using Audio and Video Information", Apr. 13, 2008, MSITT Thesis Project, pp. 1-56.*

(Continued)

*Primary Examiner* — Richemond Dorvil
*Assistant Examiner* — Mark Villena
(74) *Attorney, Agent, or Firm* — Hewlett-Packard Patent Department (57) ABSTRACT

The present invention describes a method of determining the active talker for display on a video conferencing system, including the steps of: for each participant, capturing audio data using an audio capture sensor and video data using a video capture sensor; determining the probability of active speech ($p_A$, $p_B$ ... $p_N$), where the probability of active speech is a function of the probability of soft voice detection captured by the audio capture sensor and the probability of lip motion detection captured by the video capture sensor; and automatically displaying at least the participant that has the highest probability of active speech.

22 Claims, 8 Drawing Sheets

(56) References Cited

OTHER PUBLICATIONS

Andrew Aubrey et al., "Two Novel Visual Voice Activity Detectors Based on Appearance Models and Retinal Filtering", 2007, pp. 1-5.*

Peter S. Aleksic et al., "Audio-Visual Biometrics", 2006, IEEE, pp. 2025-2044.*

Afsar Saranli, "A Unifying Theory for Rank-based Multiple Classifier Systems, with Application in Speaker Identification and Speech Recognition", Jan. 2000, pp. 1-154.*

Billibon H. Yoshimi et al., "A Multimodal Speaker Detection and Tracking System for Teleconferencing", 2002, ACM, pp. 427-428.*

* cited by examiner

SYSTEM AND METHOD FOR DETERMINING THE ACTIVE TALKERS IN A VIDEO CONFERENCE

BACKGROUND

In video conferencing systems, identifying active talkers from other locations is desirable for natural communications. However, providing, setting up, and maintaining video conferencing systems which allow the user to easily see and identify the active talker are often expensive and complex to implement, requiring significant user or technician effort to configure and maintain. For example, the HP Halo video conferencing system provides an immersive video environment where the active talker can be easily identified. However, it requires a dedicated room that has high bandwidth requirements.

Due to bandwidth limitations, many video conferencing systems have a single outbound audio and video stream from each end-point. When there are multiple people engaged in a live meeting in a room with a single out-bound connection (as one node in a multi-party video conferencing scenario), the remote participants may only see a wide-angle view of the meeting room. Due to bandwidth limitations, this view may not provide enough pixels on faces of the participants to have their expressions easily recognizable to have effective communication.

Many systems find active talkers by source localization using a microphone array. Video conferencing systems equipped with this technology often use pan-tilt-zoom cameras and microphone arrays on a single unit attached to a display and usually pan, tilt, and zoom video cameras in the direction of the active talkers. Some systems have a structured microphone array attached to the equipment. Another type of system distributes microphone arrays in a room to localize active talkers. But in most cases, these systems do not perform well enough for practical uses due to the problem of limited viewpoints and detection errors. Again, these types of video conferencing systems often require a dedicated room and a complex configuration and set up process.

A video conferencing system which easily identifies and displays the active talker and does not require a dedicated room and complex configuration process is needed.

BRIEF DESCRIPTION OF THE DRAWINGS

The figures depict implementations/embodiments of the invention and not the invention itself. Some embodiments of the invention are described, by way of example, with respect to the following Figures.

DETAILED DESCRIPTION

In teleconferencing systems, identifying active talkers from other locations is often hard, but desirable for natural communications. For this, we propose a method for automatically identifying active talkers in a meeting room with distributed sensors. In our method, for each participant, we first capture audio and video data using the audio and video capture sensor. Next, based on the captured audio and video data, we determine the probability of active speech ($p_A, p_B \ldots p_N$), where the probability of active speech is a function of the probability of soft voice detection captured by the audio capture sensor and the probability of lip motion detection captured by the video capture sensor. Next, we automatically configure the layout of the outbound video stream based on the combined probability of active speech ($p_A, p_B \ldots p_N$) of each participant, and their progression in time.

Figure 1A:
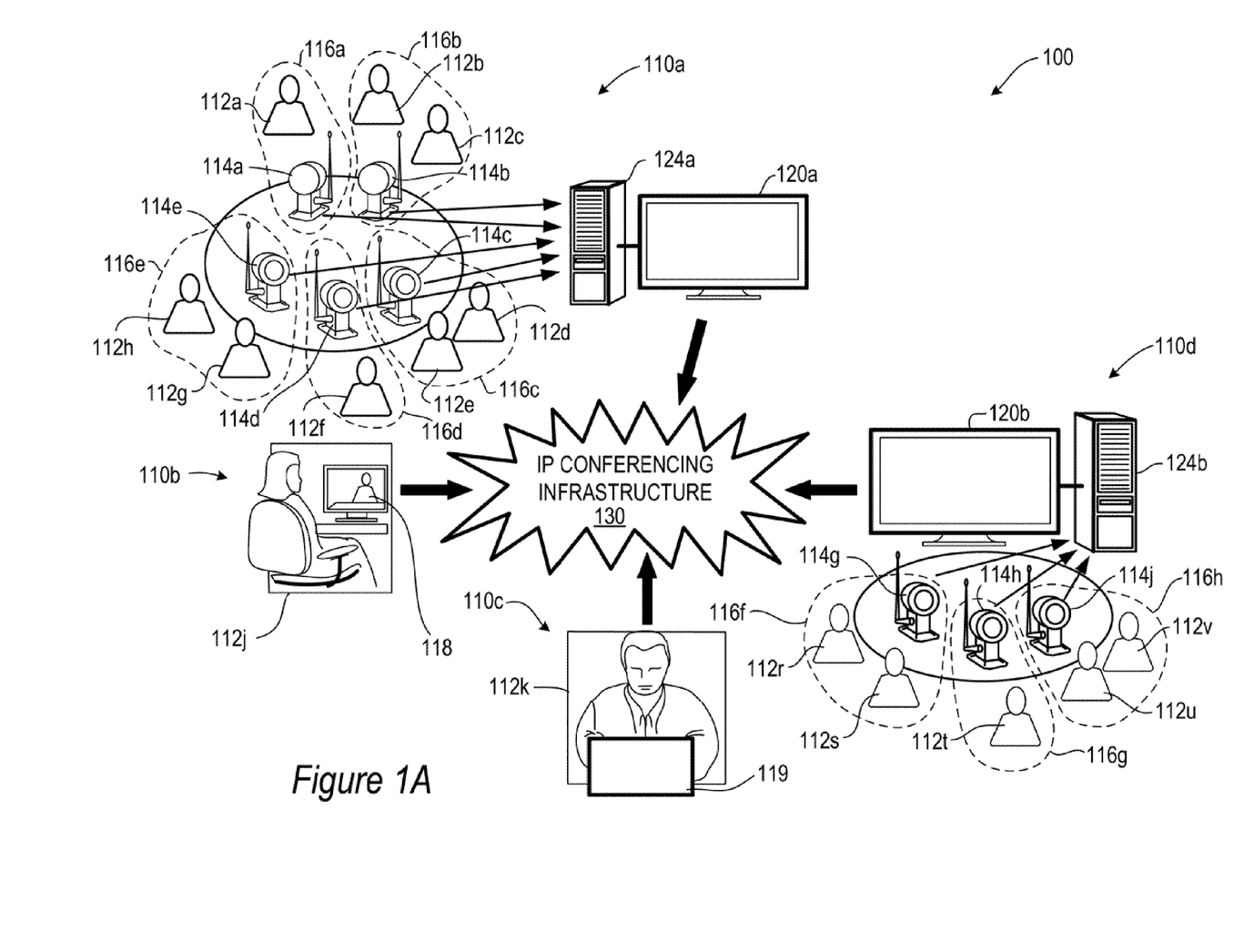
FIG. 1A shows a video conferencing configuration according to one embodiment of the present invention.

FIG. 1A shows a multipoint video conferencing configuration according to one embodiment of the present invention. Referring to FIG. 1A, the video conferencing system 100 is connected to multiple endpoints 110a-110d, where at least one of the endpoints is a conference room or meeting room that can easily set up using the methods of the present invention. In the embodiment shown in FIG. 1A, each computing device is an endpoint. The endpoint could be a server 124 for a meeting room, or the desktop 118 of a single-person or an individual on a laptop 119. In the video conferencing system of FIG. 1A, two of the endpoints 110a and 110d are meeting rooms or conference rooms, one of endpoints 110a is a desktop computer 118 associated with a single participant, and one of the endpoints 110c is a laptop computer 119 associated with a single person participating in the video conference. Although, it is possible for a single person to join the conference from a meeting room (for example 110a or 100d), in the embodiment shown there are multiple participants 112 are in each room.

For the embodiment shown in FIG. 1A, the camera (video capture sensor) and microphone (audio capture device) in the meeting room are integrated into a single integrated capture device or sensor 114. Where there are multiple participants in the meeting room, dotted lines are shown to group the audio capture sensor and video capture sensor that are associated with each participant. In the simplest case, there is one audio capture sensor and one video sensor associated with each participant. See, for example, the dotted line grouping 116a that is associated with participant 112a and the audio-video sensor 114a. Alternatively, there may be multiple participants associated with a single audio-video sensor. See, for example, the dotted line grouping 116b for participants 112b and 112c that is associated with audio-video sensor 114b.

We want to present a compelling audio-visual representation of the in-progress meeting to remote sites. Combining everything to create an output that is the most compelling user experience for viewing what is occurring at each of the different endpoints. We try to do intelligent decision making so that we send out the most relevant AV stream. One of the ways we determine what's the most relevant, (and thus minimize the AV content that is sent to other endpoints), is by determining who is talking.

In one embodiment, at least the participant who is the active talker is displayed. For the individuals viewing the meeting from a laptop or PC, the display is the screen of the computing device (laptop/PC). For a meeting room, the display 120 is typically the screen of a television 120 that is electrically connected to and controlled by the room server 124.

The present invention uses a distributed camera and microphone sensor network to cover a wide range of views of participants and to capture audio from a variety of endpoint or locations. The room server 124 that is associated with the conference room does pre-processing on the sensor data and a single audio and video stream is sent out—that fits the bandwidth requirements of the receiving systems 110a-d. The effectiveness of the system depends upon the intelligence of the server to determine the active talker and to recompose the video and audio information appropriately.

Since the invention utilizes a distributed sensor network, it is easily deployable and configurable for covering a entire meeting room with multiple participants compared to conventional methods. For easy deployment, setup within the meeting room should be quick and easy for participants to implement. Preferably, the meeting room and the audio-video capture devices 114 in the meeting room support WiFi communication. This would allow the participant to set up video conferencing system without having to implement complicating wiring configurations.

In one embodiment, the audio and/or video capture sensors 114 are a combination of cameras (high resolution image, low resolution video) and microphones. However, the sensors may include 3D sensors (time of flight, stereo-pair) and device lets (that combine video/audio capture), and netbooks with attached sensors. Cameras and/or microphones should be placed in close proximity to the participant. In one embodiment, the sensors could be positioned on the meeting room conference table or alternatively are attached (room with Velcro/suction cups) to the meeting room walls. There could be predefined rules for arrangements of the sensors to make subsequent processing simpler. For example, a configuration condition might be that each participant has a single audio-video capture sensor associated with it.

FIG. 1A shows a room server 124 connected to an IP conferencing infrastructure 130 according to one embodiment of the present invention. The present invention takes advantage of the fact that typically, present day conference rooms are connected to and associated with a networking infrastructure. This networking infrastructure is typically the company's internal network. Each meeting room typically has a server 124 associated with it which supports the room networking capabilities. Although a single server may be associated with each meeting room, dependent upon the processing requirements for the room, a single server may also be associated with and support multiple conference rooms. In many modern conference rooms, wired network connections that an individual can plug in a wired coaxial cable to provide network connection are supported. Many modern conference rooms also support WiFi connection where an individual can gain access to the company's internal network using wireless access.

Figure 1B:
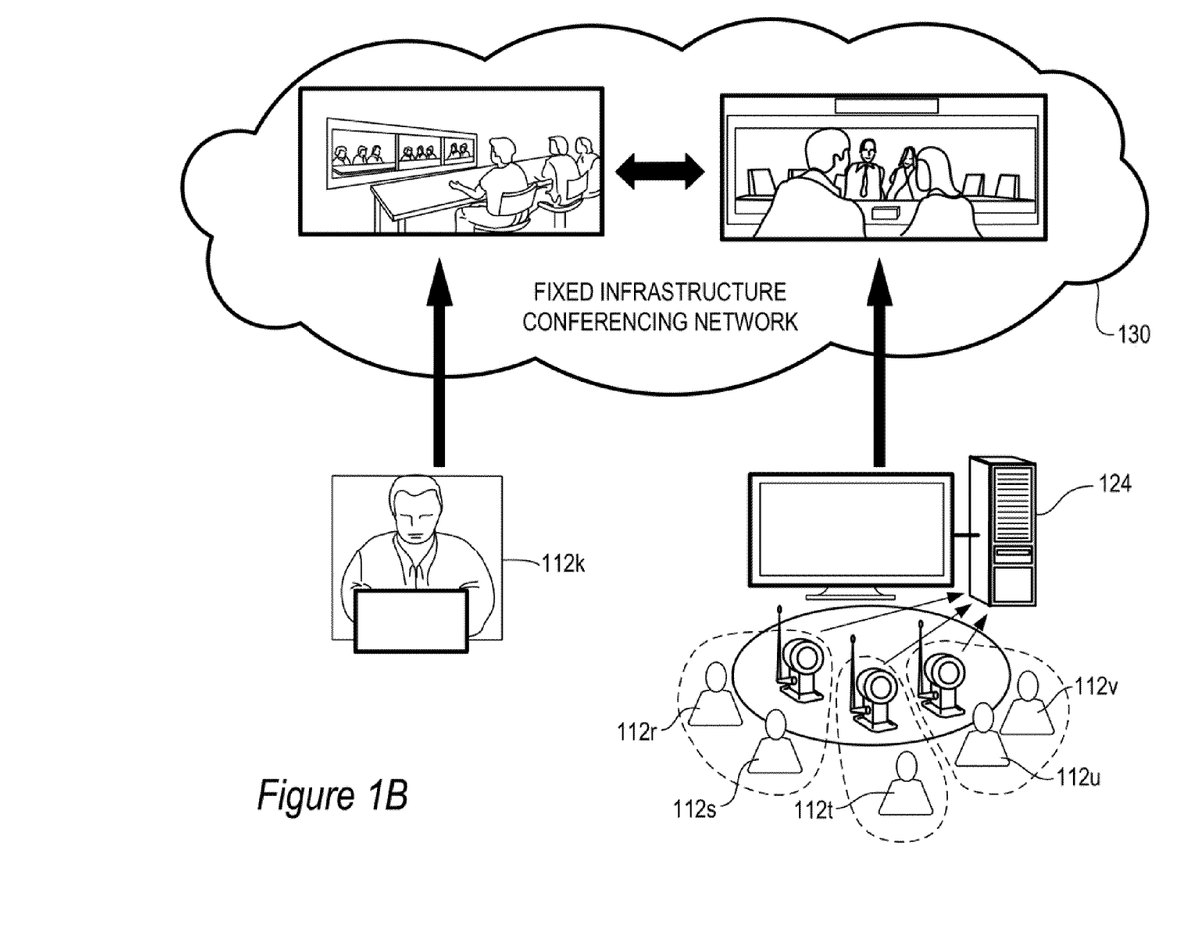
FIG. 1B shows a video conferencing configuration according to one embodiment of the present invention.

FIG. 1B shows a video conferencing configuration according to one embodiment of the present invention. The embodiment shown in FIG. 1B is similar to that shown in FIG. 1A. Similar to FIG. 1A, the video conferencing system is connected to multiple endpoints including a single participant 112k communicating with the network via a laptop computer and a room including multiple participants where audio-video information streaming from multiple sensors is communicated to the network via a room server. However, instead of IP Conferencing Infrastructure 130 shown in FIG. 1A, the endpoints in FIG. 1B communicate with a Fixed Infrastructure Conferencing Network, such as the Halo network provided by Hewlett-Packard Company.

Figure 2:
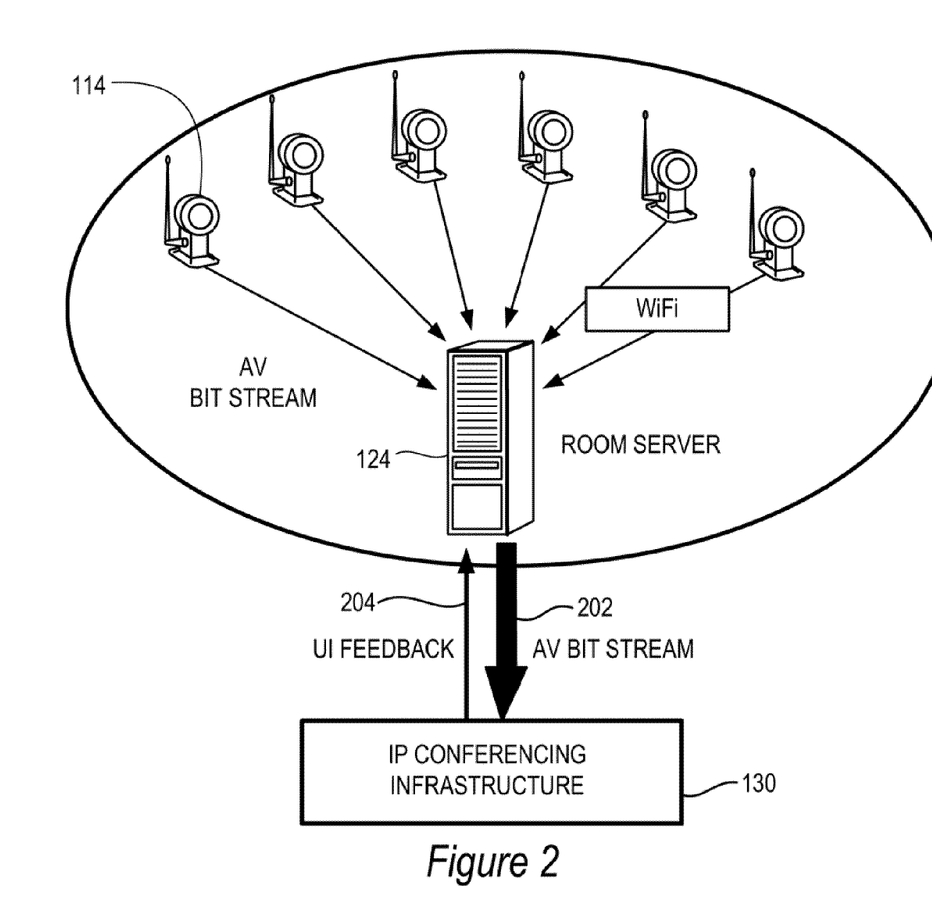
FIG. 2 shows a room server connected to an IP conferencing infrastructure according to one embodiment of the present invention.

FIG. 2 shows a room server connected to an IP conferencing infrastructure according to one embodiment of the present invention. The room server 124 acts as a sink of a wired/wireless audio visual sensor network according to the present invention. The room server receives/decodes all audio visual streams from the audio and video capture sensors 114 in the room and then performs intelligent processing to create a single outgoing audio-visual (AV) stream 202 to the IP Conferencing Infrastructure 130. In one embodiment (embodiment implemented in FIG. 1A), the outgoing AV stream is a mono-view, single-channel audio AV stream. In an alternative embodiment (the embodiment implemented in FIG. 1B), the outgoing AV stream is a multi-channel audio/multi-channel video AV stream. The room server receives as input a single AV bit stream 204 from the IP conference infrastructure.

The AV stream 202 that is output, depends on the bandwidth constraints of the endpoints 110a-d where the AV stream will be received. Within the conference room assume high bandwidth availability and high processing capability. But also assume external bandwidth outside the room is limited. Typically for a meeting room, the bandwidth internally is much higher than the, bandwidth constraints outside of the meeting room. We typically capture more information internally than we can send out. For example, in FIG. 2 there are six audio-visual capture sensors. Preferably, there is a single audio-visual capture sensor for each participant in the meeting. However, it may not be sensible to send all six AV streams over the bandwidth constrained network. In this case, internal pre-processing is performed by the room server before data is transmitted over the bandwidth constrained network.

In one embodiment, the server is not physically located in the room but in the network that is associated with the conference room. The server receives the audio visual stream and it does some sort of decision making and then it generates a single edited audio visual stream that gets sent out.

Figure 3A:
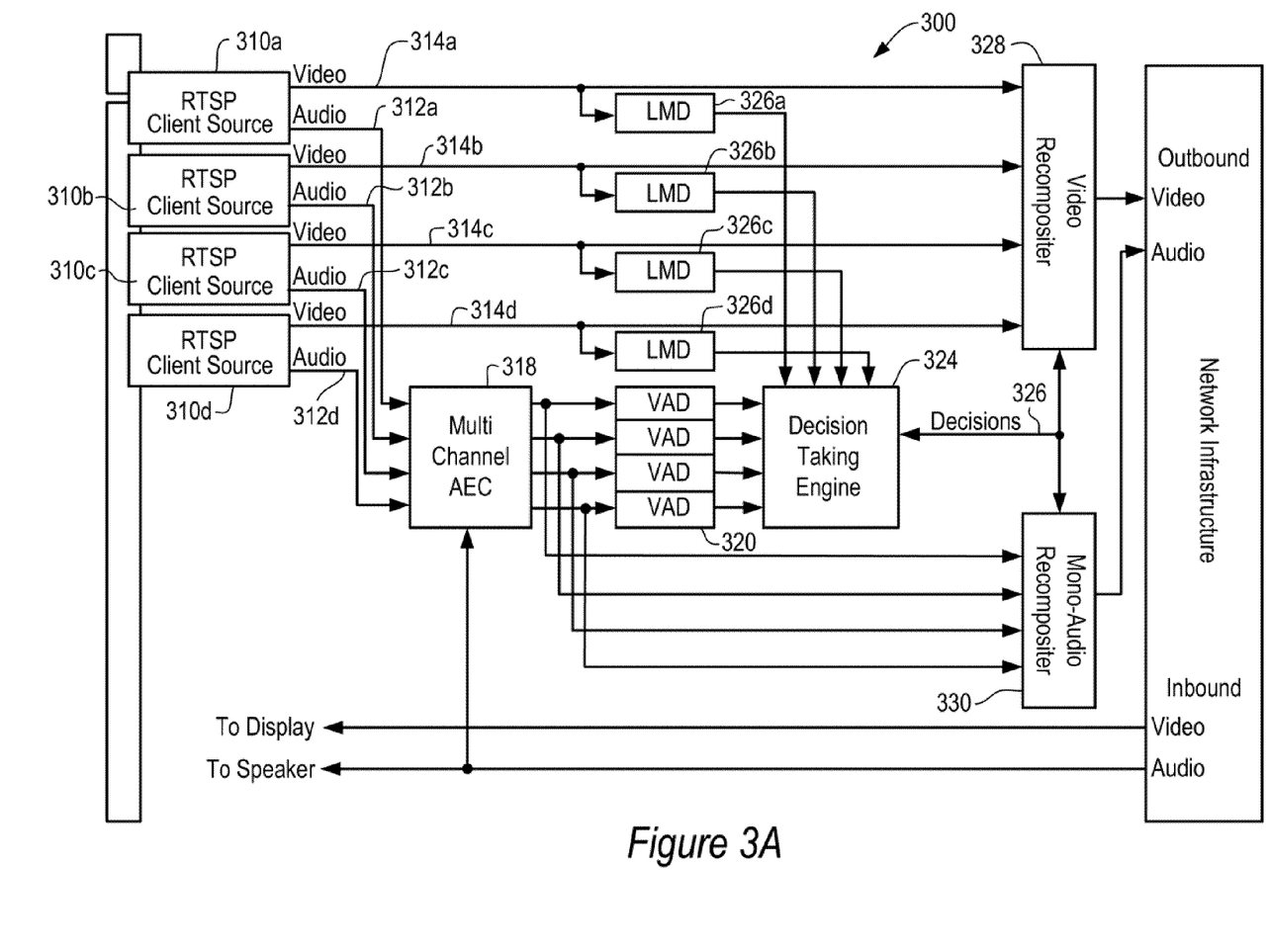
FIG. 3A shows a distributed Network Audio in, Single-view Mono-Audio Out video conferencing system architecture according to one embodiment of the present invention.

FIG. 3A shows a distributed network audio in, single-view mono-audio out video conferencing system architecture according to one embodiment of the present invention. Referring to FIG. 3A shows a plurality of RTSP (Real Time Streaming Protocol) client sources 310a-d. In the embodiment shown, the client sources 310a-d are equipped with a microphone and video pair that provides two way or multi-way communication (produces both an audio 312a-d and video 314a-d data streams). The audio 312a-d data streams are input into a Multichannel AEC (Acoustic Echo Cancellation) module 318.

The Multichannel AEC 318 cancels the echo from remote speakers so that only the local talkers (local participants) in the meeting room are picked up by the microphones in the meeting room. The audio output of the local participant is output from the Multichannel AEC 318, which is connected both to the Voice Activity Detection (VAD) module 320 and Mono-Audio Recomposiler 330. For each local participant, the VAD module 320 provides input as to whether a participant is speaking. This data is input into the Decision Taking Engine 324.

Referring to FIG. 3A, the video output 314a-d from the wireless camera is input into a LMD (Lip Motion Detector) module 326a-d. Typically the LMD module 326 is implemented in software. The software typically first does analysis of the video content to do face detection which is followed by detection of the lip area. If there is change in the lip area (motion), then it is probable that the participant whose face is detected is talking. This data (lip movement) is fed into the Decision Taking Engine 324 along with output from the VAD.

Figure 4:
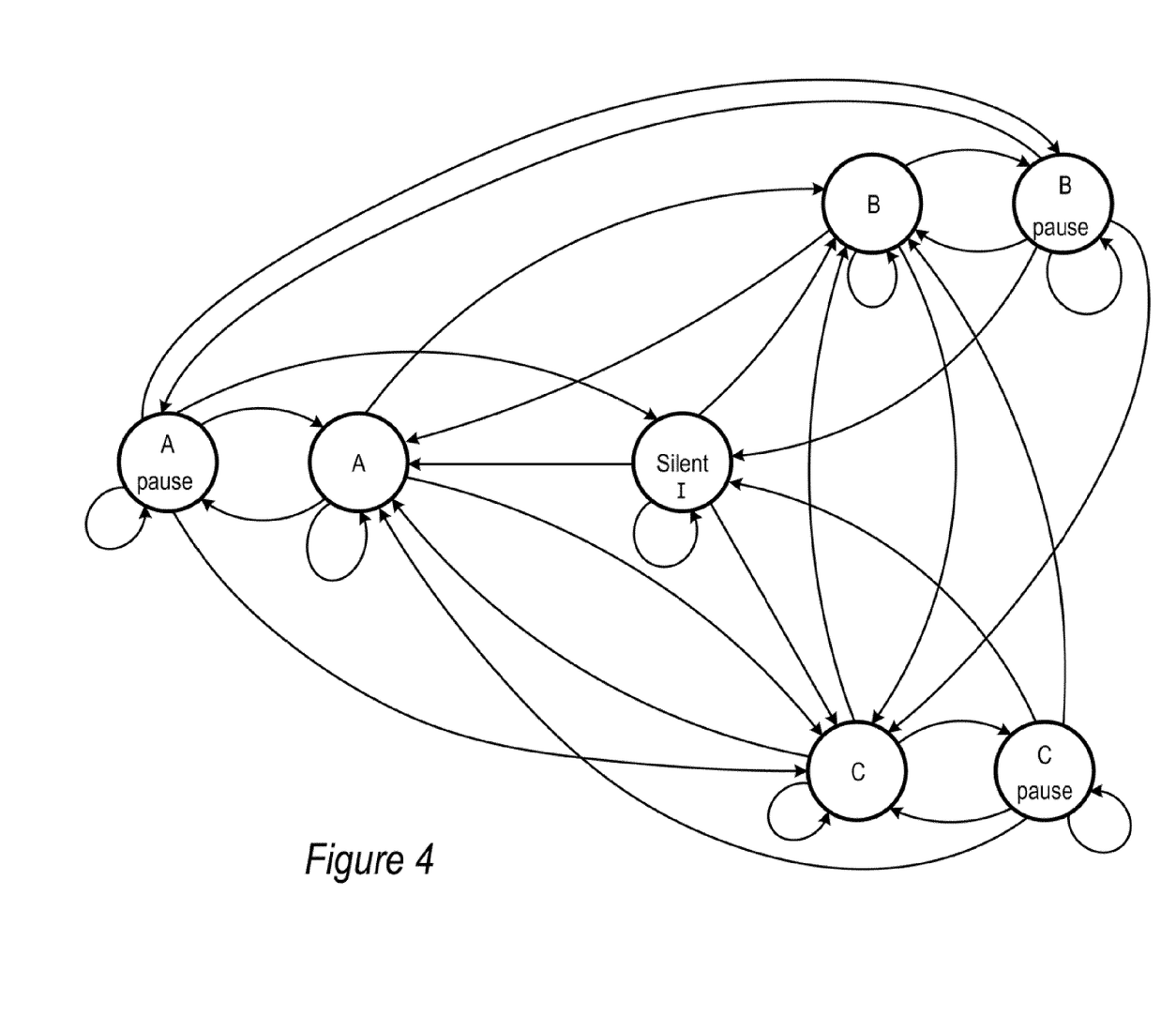
FIG. 4 shows a state diagram according to one embodiment of the present invention.
Figure 5:
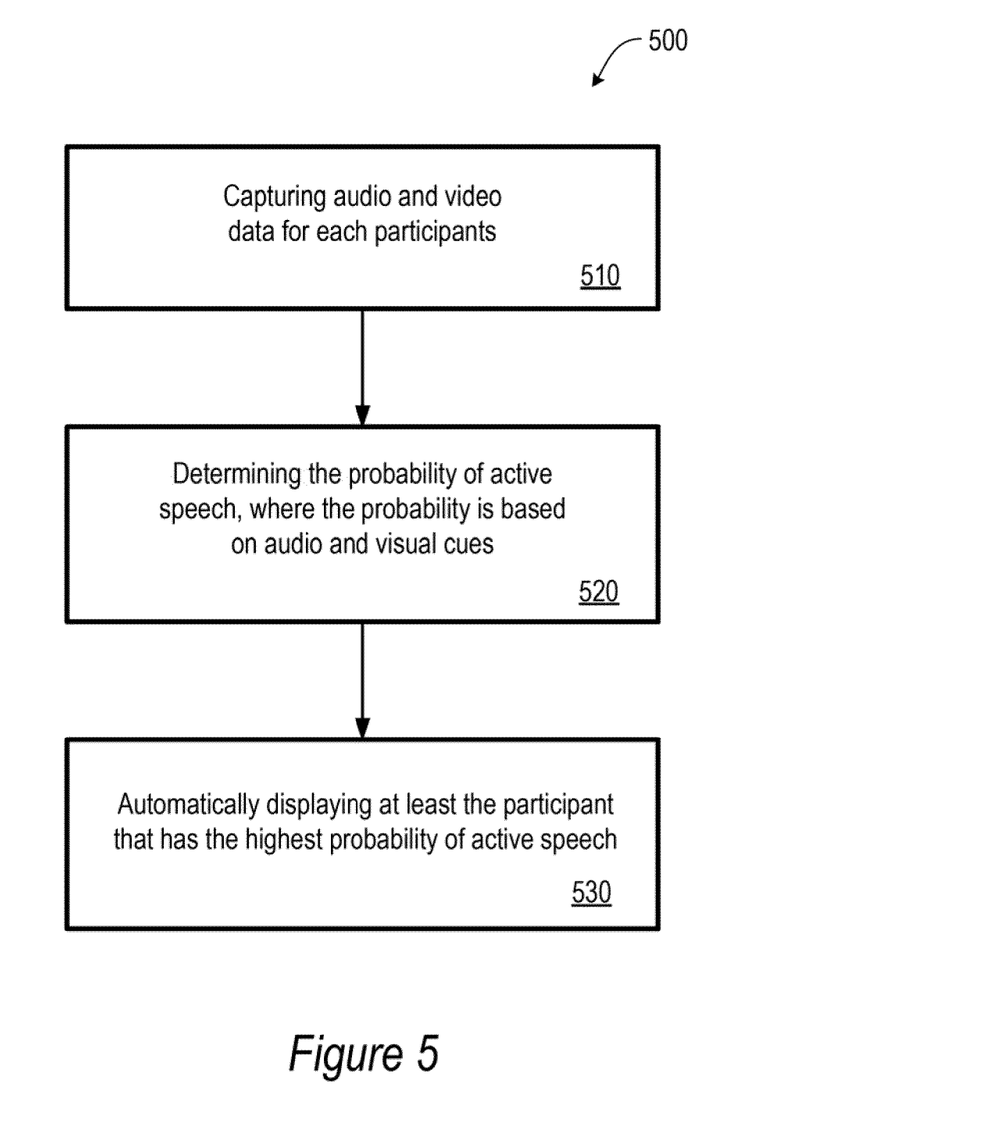
FIG. 5 shows a flowchart of the method of determining the active talker according to one embodiment of the present invention.

The Decision Taking Engine 324 is software (or hardware) which among other things, implements the described invention, including but not limited to implementation of the state machine shown in FIG. 4 and the method shown in FIG. 5 and its associated text. The Decision Taking Engine 324 uses both audio cues and visual cues to make a decision of which audio and visual data corresponds to the active talker. This decision/information 326 is input to the Video Recompositer 328 and the Mono-Audio Recompositer 330 to compose a single outbound audio stream and a single outbound video stream.

What data is sent via the single outbound audio stream and the single outbound video stream depends upon the outbound bandwidth limitations and what participants are active talkers. The simplest case is where there is a single active talker. Dependent upon bandwidth limitations, you might simply want to send out a single outbound video and audio data stream. For example, say the active talker is on camera 2 (310b). Then you might only send out the audio and video stream from wireless camera 310b.

Dependent on the desired video configuration and bandwidth requirements, additional data might also be sent. Say for example, you wanted to show thumbnails of the three participants who were not talking in addition to showing the active talker. One layout configuration would be the configuration shown in FIG. 3C where the largest window 360 is the active talker and the other participants are shown as thumbnails 362a-c. For this case, at least a portion of the audio video data from the four cameras would need to be sent in the single outbound audio and video stream. Say for example, two talkers are having a back and forth conversation where whom the active talker is, constantly switches back and forth between the two participants. In this case, it might be desirable to use the layout configuration shown in FIG. 3D—a split screen view with two equal sized screens. Of course, different layout configurations are possible. What is most important is to create a presentation that provides a user experience that is indicative of what is going on in the meeting rooms. This is typically done by providing the highest resolution audio and video and largest size view of the most active talker(s).

Besides layout, feedback could be provided to a participant whose face is not clearly detectable by the video capture sensor. For example, the picture of the participant might change colors, change resolution, etc. to give feedback to the participant that they are out of frame.

Figure 3B:
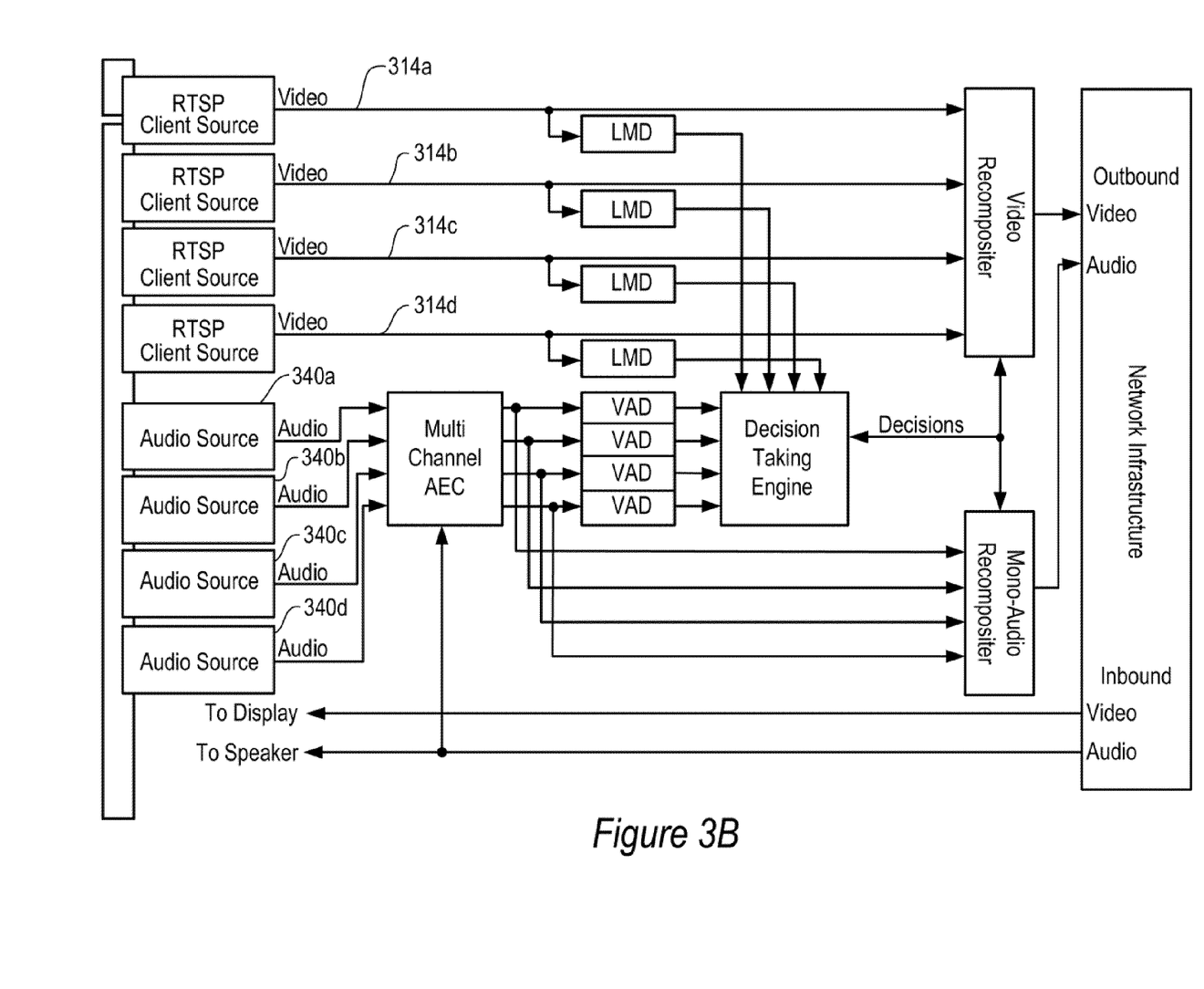
FIG. 3B shows a distributed ASIO (Audio Signal Input/Output) video conferencing system architecture with a single audio capture device according to one embodiment of the present invention.
Figure 3C:
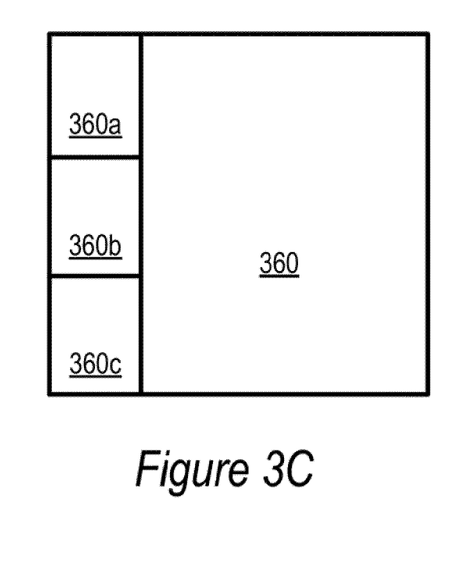
FIG. 3C shows one video display configuration according to one embodiment of the present invention.
Figure 3D:
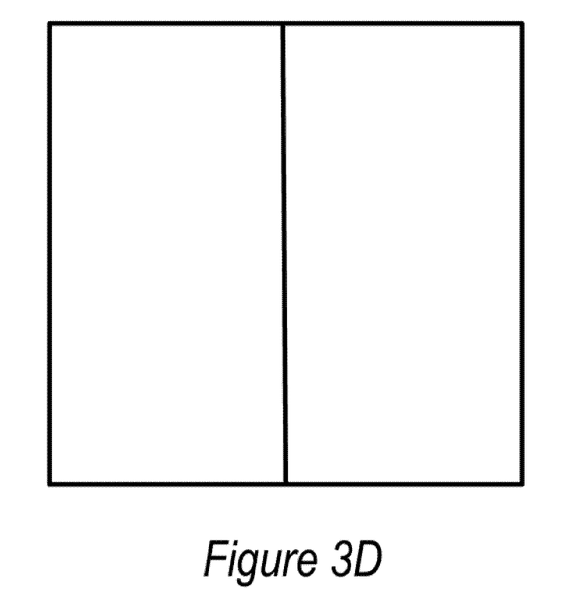
FIG. 3D shows one video display configuration according to one embodiment of the present invention.

FIG. 3A shows a distributed Network Audio In, Single-view Mono-Audio Out video conferencing system architecture according to one embodiment of the present invention. FIG. 3B shows a distributed ASIO (Audio Signal Input/Output) video conferencing system architecture according to an alternative embodiment of the present invention. The differences between two architectures shown in FIGS. 3A and 3B is minimal. The primary difference between the two architectures is the audio source. In FIG. 3A, the audio and video are integrated and output from a single wireless camera. In FIG. 3B, although a wireless camera may still be used and it may provide an audio source, the audio source from the camera is not used. Instead a separate audio source (typically wired) is used. This separate audio source helps to prevent issues related to the delay with the camera's audio capture time that can cause jitter, which potentially can break the Multichannel AEC module.

Even though cameras 310 in FIG. 3B may have audio capability, the audio in the camera is not being used and is not shown emerging from the RTSP client source. Instead, audio is provided by a separate audio source 340a-d. Typically the audio source is a separate wired microphone. In one embodiment, the microphone is mounted on the camera. Although it is not necessary for the mounted on the camera, the video source (camera) and the audio source (microphone) do need to be physically proximate to each other to provide optimal performance. Because the microphone is typically a wired microphone, it is harder for the participant in the meeting room to configure the configuration shown in FIG. 3B as compared to the configuration shown in FIG. 3A, Since ensuring the wired connections are properly made adds an additional step.

Referring to FIG. 4 shows a state diagram according to one embodiment of the present invention. In the embodiment shown in FIG. 4, there are three participants and three active speaker states A, B and C. Corresponding to the active states are the pause states A-pause, B-pause and C-pause which represent pauses in the speech of the three participant speakers. FIG. 4 also shows a silent state where none of the three participants are speaking. The state machine thus has 2N+1 states, where N is the number of participants. All state transitions are driven by observation input $p=\{p_A, p_B, p_C\}$ and the duration of the previous state. These constraints can be enforced using the run-based transition probability adaptation method. For simplicity's sake, the following discussions do not include cases when we have more than one active talkers.

State transition probabilities are made a function of duration (run) in that state, for a given path. Frequent transitions can cause the video display to be jerky and not esthetically pleasing to the viewer. Thus, when the state machine enters an active state (A, B, C), a switch to another active state or the silent state should not be made immediately. Instead, the transition should occur only after a predetermined set minimum length of time in the state.

The N state is reflective of activity (either sound being produced by participant N and/or lip motion by participant N). Natural speech will have pauses between the speech being articulated. For the pauses between speech, the audio and video data go into the N-pause state (where N is equal to A, B, or C for the state diagram shown in FIG. 4). For the pauses between speech, the speech will go into the pause state over and over again. When the speaker N speaks again, the state machine goes from the pause state to the active state (A, B, C). If the speech stays in the pause state for the predetermined time set as the minimum time to transition to silence, then the state diagram will transition from pause to silent. In the state diagram shown in FIG. 4, the speech always transitions from pause to silent and not from the active state to the silent state.

The state diagram also shows transitioning from one active state to another active state. For example, if you are in state A and B starts talking, the state diagram will transition from state A to state B. When you're in a state, whether a transition occurs is in part dependent upon the amount of time you are in the state. A transition between state A and state B occurs as long as speaker B has been speaking for the minimum time designated by the program. This minimum time is set, as previously stated, to minimize too frequent transitions and jerkiness in the video output. This is a high level decision that is made with the presentation in mind.

Display or layout (see for example layout of FIGS. 3C and 3D) is a function of the bandwidth constraints of the endpoint, but it can also be a function of the duration or time in the state. Referring to FIG. 4, the following discussion describes different display possibilities that are dependent in part on the state or duration in a particular state. These are just some possibilities and others are available—with the goal being an optimal user experience. If the speech is in the A/A-pause state, then speaker A should be shown at highest resolution and the other participants (B, C) should be shown at low resolution or not at all. If the speech is in the B/B-pause state, then speaker B should be shown at highest resolution and the other participants (A, C) should be shown at low resolution or not at all. If the speech is in the C/C-pause state, then speaker C should be shown at highest resolution and the other participants (A, B) should be shown at low resolution or not at all. For the silent state, a default view is shown—possibly a wide angle view capturing the entire room or alternatively a split screen view where every speaker is displayed using an equal sized thumbnail.

Discussed below are further higher level display decisions that can be made based on the temporal progression of the state machine. If we switched between (A/A-pause) and (B/B-pause) states one after another a few times, then we may use a dual split-screen view that displays both participant A and participant B at higher resolution than the other participants when we are in one of the states A/A-pause or B/B-pause. However, if we then stayed in state A/A-pause for a long enough time period, than we may go back to displaying A only in high resolution. To summarize, whenever there is a view change based on the initial mappings, we can check the history of previous view changes and then decide whether to use the dual split-screen view with the current and the previous speakers displayed at high resolution, or whether to display only the current speaker at high resolution. Further, we can change from dual split screen to single view if the initial machine keeps staying in the (Speaker/Speaker-pause) state for long enough. The above discussion readily generalizes to showing an arbitrary subset (not just 2) of speakers at higher resolution than the rest.

Many times switching between media content streams is done using labor intensive manual editing techniques. The present invention describes a process where which content is being displayed and the period of time the content is being displayed is done automatically. The automatic display and switching of content is typically controlled by software in the decision taking engine 304. The server automatically switches views depending on whom the active speaker based on audio and video analysis and the rules embodied in the state machine shown in FIGS. 4 and 5 and the descriptions herein.

In videoconferencing systems, especially with large numbers of participants, it can be difficult to determine the active talker. This invention is aimed at finding active talkers given data stream captured by multiple sensors in the same room. The invention considers a system with distributed sensor networks where sensors consisting of a microphone and camera capture audio-visual scenes of a meeting room with different viewpoints. When meeting participants start talking, all microphones capture speech signals from active talkers at different levels. Our method continuously monitors likelihood of having speech in acoustic signals captured by all microphones and determine active talkers by comparing individual likelihoods that a participant is speaking.

FIG. 5 shows a flowchart of the method of determining the active talker according to one embodiment of the present invention. The method includes the steps of: for each participant, capturing audio data using an audio capture sensor and video data using a video capture sensor (step 510); determining the probability of active speech ($P_A$, $p_B$ ... $p_N$), where the probability of active speech is a function of the probability of soft voice detection captured by the audio capture sensor and the probability of lip motion detection captured by the video capture sensor (step 520); and automatically displaying at least the participant that has the highest probability of active speech (530).

The method described by the present invention continuously monitors the likelihood of having speech captured by all microphones and video captured by all the cameras, and determines the active talker by comparing the likelihoods of active speech for each participant (A, B, C). Where $P_A$ is the likelihood of speaker A being involved in active speech, the likelihood or probability of A being involved in active speech is derived from and is a function of both $p_A^{(VAD)}$ and $P_A^{(LMD)}$. Thus, $p_A = f(p_A^{(VAD)}, p_A^{(LMD)})$ where $p_A^{(VAD)}$ is an audio-based soft voice activity detection result and $p_A^{(LMD)}$ is a visual lip motion detection result.

The likelihood of active speech is computed for each speaker. For example, $p_B$ is the likelihood of speaker B being engaged in active speech and $p_C$ is the likelihood of speaker C being engaged in active speech. The speaker with the highest likelihood of being in active speech is generally considered to be the active talker, but various smoothing techniques need to be employed because the raw likelihood data is noisy. Typically, it is the audio and video data streams of the active talker that is displayed more prominently in the conferencing system endpoints.

Referring to FIGS. 2A and 2B, the VAD detects whether or not active speech is detected from the audio stream captured from the audio sensor 312, as well as provides an indication of the strength of the signal (loudness). A VAD typically used in speech coding or speech recognition systems determines only if there is active speech in a digitized audio frame. The most straightforward audio feature for such systems is volume or loudness measurement, as adopted in many practical systems, because active voiced speech is typically louder than ambient noise. However, sophisticated VAD systems also use various spectral analysis and decision mechanisms, to make their decision independent of loudness in order to prune out loud non-speech noise sources. For our application however, loudness is more important to represent than in typical VAD, because in one embodiment we are making an assumption regarding the likelihood of who the active speaker is, based on volume at the microphones. Generally speaking our $p_A^{(VAD)}$ is a function of a typical VAD output independent of loudness, and a loudness measure itself. In one embodiment, assuming that the VAD output is either binary (0 or 1) or a soft value between 0 and 1, $p_A^{(VAD)}$ would be the product of this detector-only value with a positive loudness measure.

Assume, for purposes of example, that speaker A is sitting directly in front of microphone A and that are two other microphones in the meeting room. There might be three microphones that pick up speaker A's voice (all 3 VAD active). However, the described invention makes the assumption that the microphone next to the speaker will pick up the strongest signal (loudest volume). If we know the meeting room layout (assume for example, one speaker associated with each microphone), then we can determine who the active speaker is by determining which microphone is receiving the loudest volume. We continuously monitor the signal at each microphone and determine that the microphone with the largest $p_A^{(VAD)}$ is the microphone most probably associated with the active speaker.

Because the assumption that the active speaker has the largest $P_A^{(VAD)}$ at the microphone is not always accurate, the described invention uses a visual cue to provide additional assurance regarding the veracity of the determination of which participant is the active talker. In our case, we use lip motion detection to provide this additional assurance. As previously stated, $p_A = f(p_A^{(VAD)}, p_A^{(LMD)})$. Thus the probability that a particular participant is speaking is both a function of the probability $p_N^{(VAD)}$ of audio-based soft voice activity detection and the probability $p_N^{(LMD)}$ of visual lip motion detection.

You can use the combination of these two soft measures—one from audio/one from video, to get a more accurate analysis. For example, say there is a 60% probability that speaker A is the active talker. You can provide further confirmation that speaker A is the active talker by performing video data analysis in the lip area of the face (the LMD module 326). In one embodiment, a Lip motion detector is designed as follows. A face detector detects the location of a face in every frame of video. A face-tracker may be used to make the detection result more robust. The face detector typically returns the location of a detected face in the form of a circle or an ellipse, or a rectangle. The mouth location is typically in the middle of the bottom half of this shape. A suitable-sized rectangle is assumed at the approximate face location, and a histogram of the luminance values within this area is computed, and normalized by the number of pixels. From one frame to the next, this histogram would change a little due to noise, but if someone is moving his/her mouth as in active speech it is likely to change more. Thus, a bandpass filtering operation on a measure of the frame to frame change may be used to indicate whether the speaker is talking. This output can be used to reinforce the audio-based likelihood information. If there is motion in the lip area (high $p_N^{(LMD)}$) then it is probable that the participant whose face is detected is talking. If there is no motion in the lip area (low $p_N^{(LMD)}$) then it is probable that the participant whose face is detected is not the active talker.

For the described invention, we continuously monitor audio and video content and maintain a history of p vectors for a running window of M frames. The audio signal can actually be very noisy—so it is not always easy to make the decision as to who the active talker is purely by the strength of the signal (volume) alone. Because the audio signal is noisy, the resulting likelihood data is also noisy. To minimize the noise, a smoothing operation is needed to operate on individual likelihoods to avoid erroneous detection and/or abrupt changes of active talkers. In one embodiment, the smoothing filter is a linear filter. In an alternative embodiment, the smoothing filter is a non-linear filter.

The microphone that is capturing the audio signal of the active speaker should have the strongest signal strength of any microphone in the meeting room for the entire duration that the active speaker is talking. However, if the signal is noisy, this may not be true. Instead, the signal may go back and forth between microphones but on an average (within a reasonable time window) the signal should be the strongest. In one embodiment, after a smoothing filter is applied—a median filter is applied to minimize this effect. The median filter is applied to output for appropriately sized window. The purpose of median filter is to analyze the media content within the specified time window (say microphone A has maximum number of strong values within time period). The present invention tries to utilize this information (the output of the median filter) to make a decision as to whom the active talker is. The median filter will filter on the decision of the maximum—what is the strongest signal the maximum amount of time.

As previously described in one embodiment of the method used to detect the most active speaker includes the following steps: (1) Apply a smoothing filter on the likelihood data from each microphone and each camera, (2) Combine the audio and video likelihood data into a combined speech likelihood (3) Pick the maximum number of the smoothed combined likelihood data among the microphones and cameras. If the maximum combined likelihood is greater than a threshold T, then decide the corresponding microphone/camera as the active speaker. If the combined likelihood is smaller than T, then we decide there is no active speech (4) Median filter the output from step 3 with the appropriate sized window. In an alternative embodiment, the steps after step (2) are modified. After applying a smoothing filter on the likelihood data, the following steps are occur: (3) Rank the combined likelihood data from the microphones/cameras, and (4) Then apply another smoothing filter on the rank from each microphone/camera and (5) Pick the minimum of the smoothed rank among all of the microphones. We rank the active speakers according to their likelihoods. So the highest likelihood gets a rank of 1, the second highest gets a rank of 2, and so on. Thus the lower the rank, the higher the likelihood. If the minimum of the smoothed rank is lower than a threshold R, then decide the corresponding microphone/camera as the active speaker. If not, decide that there is no active speaker.

In both the above cases, there are N+1 possible decisions made, if there are N camera/microphone pairs. These N+1 decisions are next used to decide the state-transitions, based on duration in the current state.

A more sophisticated approach is to work directly in the probability/likelihood domain. The smoothed observation values after step 2 above are represented by $p^*=\{p_A^*, p_B^*, p_C^*\}$. From this we should compute the probabilities of $p^*$ given all the possible states: Pr ($p^*$|s) where s is all of the possible 2N+1 states. From these observations, we can use dynamic programming based method to find the optimal sequence of states, by looking ahead a few frames. In one embodiment, the Truncated Viterbi algorithm may be used, where a decision is made delayed in time, corresponding to the best partial path metric. Further, the state transition probabilities in this approach are modulated based on duration in the state to ensure abrupt transitions do not happen.

Although the simplest implementation to process and to determine which speaker is the active speaker occurs for the configuration where there is one speaker for each microphone and each video camera. In some embodiments, as can be seen in FIGS. 1A and 1B, there is more than one participant associated with each camera/microphone pair. In this case, the visual cues can further refine who the active speaker is. For example, we may know by the soft voice detection what microphone has the highest likelihood of probability of having active speech. However, if there are two or more speakers we will not know which speaker is speaking. In one embodiment, we could display the two or more speakers associated with the microphone. However, in one embodiment, we could use the lip motion module to detect which of the k speakers associated with the microphone, is the active speaker and display only the face of the active speaker. In one embodiment this is done by editing the video content to maintain the video associated with the face/body of the active speaker and delete the video of the person that is in the group with the active speaker who is not speaking. Alternatively, the lip detection module could be used to tell which speaker in the group is the active talker and to focus the camera on that person.

Any one or more of the embodiments described herein can be implemented using computer readable storage medium and computer-executable instructions which reside, for example, in computer readable storage medium of the computer system or like device. The computer readable storage medium can be any kind of memory that instructions can be stored on. Examples of the computer readable storage medium include but are not limited to a disk, a compact disk (CD), a digital versatile device (DVD), read only memory (ROM), flash, and so on. As described above, certain processes and operation of various embodiments of the present invention are realized, in one embodiment, as a series of instructions (e.g. software program) that reside within computer readable storage memory of a computer system and are executed by the processor of the computer system. When executed, the instructions cause the computer system to implement the functionality of the various embodiments of the present invention.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method of determining an active talker for display on a video conferencing system, the method comprising:
    implementing a state machine, the state machine having an active state and a pause state for each of N participants in a video conferencing session, the state machine also having a silent state;
    for each of the N participants, capturing audio data using an audio capture sensor and video data using a video capture sensor;
    determining a first state of the state machine;
    determining transition probabilities from the first state to other states in the state machine based on corresponding probabilities of active speech by the N participants ($p_A$, $p_B \ldots p_N$), where the probabilities of active speech are functions of a probability of soft voice detection captured by the audio capture sensor for a corresponding one of the participants and a probability of lip motion detection captured by the video capture sensor for the corresponding one of the participants;
    selecting a second state of the state machine based on the transition probabilities, the second state corresponding to an active talker; and
    automatically displaying at least the active talker corresponding to the second state.

2. The method recited in claim 1 further including denoising the probabilities of active speech by applying a smoothing filter to generate smoothed probability values, wherein the smoothed probability values are represented by ($p_A^*$, $p_B^* \ldots p_N^*$).

3. The method recited in claim 2, wherein the smoothing filter is a nonlinear filter.

4. The method recited in claim 2, wherein the smoothing filter is a linear filter.

5. The method recited in claim 2, further including applying a median filter to an output of the smoothing filter.

6. The method recited in claim 2, further including determining a maximum value of the smoothed probability values ($p_A^*$, $p_B^* \ldots p_N^*$).

7. The method recited in claim 6, further including comparing the maximum value of the smoothed probability values ($p_A^*$, $p_B^* \ldots p_N^*$) to a threshold value.

8. The method recited in claim 7, further including, when the maximum value of the smoothed probability values ($p_A^*$, $p_B^* \ldots p_N^*$) is greater than the threshold value, setting the state machine to one of the active states that corresponds to the maximum value of the smoothed probability values.

9. The method recited in claim 8, further including setting the state machine to the silent state when the maximum value of the smoothed probability values ($p_A^*$, $p_B^* \ldots p_N^*$) is less than the threshold value.

10. The method recited in claim 2, further including ranking the smoothed probability values ($p_A^*$, $p_B^* \ldots p_N^*$).

11. The method recited in claim 10, further including comparing a lowest ranked one of the smoothed probability values ($p_A^*$, $p_B^* \ldots p_N^*$) to a threshold value.

12. The method recited in claim 11, further including setting the state machine to one of the active states that corresponds to the lowest ranked participant when the lowest ranked one of the smoothed probability values ($p_A^*$, $p_B^* \ldots p_N^*$) is greater than the threshold value.

13. The method recited in claim 12, further including setting the state machine to the silent state when the lowest ranked one of the smoothed probability values ($p_A^*$, $p_B^* \ldots p_N^*$) is less than the threshold value.

14. The method recited in claim 2, further including determining the probabilities of $p^* = (p_A^*, p_B^* \ldots p_N^*)$, given all possible states Pr ($p^*$|s) where s is all of the possible 2N+1 states.

15. The method recited in claim 14, further including finding a sequence of the states using dynamic programming.

16. The method recited in claim 15, wherein finding the sequence of the states using dynamic programming includes using a truncated Viterbi algorithm.

17. The method recited in claim 16, wherein the transition probabilities are modulated based on a duration in the first state.

18. The method as defined in claim 1, wherein the state machine is one state machine having (1) N active states corresponding to the N participants, (2) N inactive states corresponding to the N participants, and (3) the silent state, N being at least three.

19. The method as defined in claim 18, wherein the transition probabilities include N+1 probabilities corresponding to the N active states and the silent state.

20. The method as defined in claim 1, wherein the determining of the transition probabilities includes determining three or more transition probabilities from the first state.

21. A computer readable storage device or storage disk comprising computer-readable instructions which, when executed, cause a processor to at least:
    implement a state machine, the state machine having an active state and a pause state for each of N participants in a video conferencing session, the state machine also having a silent state;
    for each of the N participants, capture audio data using an audio capture sensor and video data using a video capture sensor;
    determine a first state of the state machine;
    determine transition probabilities from the first state to other states in the state machine based on corresponding probabilities of active speech by the N participants ($p_A^*$, $p_B^* \ldots p_N^*$), where the probabilities of active speech are functions of a probability of soft voice detection captured by the audio capture sensor for a corresponding one of the participants and a probability of lip motion detection captured by the video capture sensor for the corresponding one of the participants;

select a second state of the state machine based on the transition probabilities; and automatically display at least an active talker corresponding to the second state.

22. An apparatus for providing feedback to a participant in a video conference, the apparatus comprising:

a processor; and a memory including computer-readable instructions which, when executed by the processor, cause the processor to at least:

implement a state machine, the state machine having an active state and a pause state for each of N participants in a video conferencing session, the state machine also having a silent state;

for each of the N participants, capture audio data using an audio capture sensor and video data using a video capture sensor;

determine a first state of the state machine;

determine transition probabilities from the first state to other states in the state machine based on corresponding probabilities of active speech by the N participants $(p_A^*, p_B^* \ldots p_N^*)$, where the probabilities of active speech are functions of a probability of soft voice detection captured by the audio capture sensor for a corresponding one of the participants and a probability of lip motion detection captured by the video capture sensor for the corresponding one of the participants;

select a second state of the state machine based on the transition probabilities; and automatically display at least an active talker corresponding to the second state.

* * * * *

UNITED STATES PATENT AND TRADEMARK OFFICE
CERTIFICATE OF CORRECTION

| | | |
|---|---|---|
| PATENT NO. | : 9,154,730 B2 | Page 1 of 1 |
| APPLICATION NO. | : 12/580958 | |
| DATED | : October 6, 2015 | |
| INVENTOR(S) | : Bowon Lee et al. | |

It is certified that error appears in the above-identified patent and that said Letters Patent is hereby corrected as shown below:

In the claims

In column 12, line 29, in Claim 14, delete "Pr (p*Is)" and insert -- Pr (p*|s) --, therefor.

Signed and Sealed this
Seventeenth Day of May, 2016

Michelle K. Lee
*Director of the United States Patent and Trademark Office*